(12) United States Patent
Schurmann (10) Patent No.: US 9,259,801 B2
(45) Date of Patent: Feb. 16, 2016

(54) LASER PROCESSING HEAD AND METHOD FOR PROCESSING A WORKPIECE BY MEANS OF A LASER BEAM

(75) Inventor: Bert Schurmann, Gernsbach (DE)

(73) Assignee: PRECITEC KG, Gaggenau-Bad Rotenfels (DE)

(*) Notice: Subject to any disclaimer, the term of this patent is extended or adjusted under 35 U.S.C. 154(b) by 516 days.

(21) Appl. No.: 13/583,904

(22) PCT Filed: Mar. 10, 2011

(86) PCT No.: PCT/EP2011/001196
§ 371 (c)(1),
(2), (4) Date: Oct. 5, 2012

(87) PCT Pub. No.: WO2011/110357
PCT Pub. Date: Sep. 15, 2011

(65) Prior Publication Data
US 2013/0043225 A1   Feb. 21, 2013

(30) Foreign Application Priority Data
Mar. 12, 2010   (DE) .......................... 10 2010 011 253

(51) Int. Cl.
B23K 26/00   (2014.01)
B23K 26/02   (2014.01)
B23K 26/04   (2014.01)

(52) U.S. Cl.
CPC ............. *B23K 26/044* (2015.10); *B23K 26/048* (2013.01)

(58) Field of Classification Search
CPC .......................................... B23K 26/04–26/048
USPC .......................................... 219/121.6–121.83
See application file for complete search history.

(56) References Cited

U.S. PATENT DOCUMENTS

| | | | |
|---|---|---|---|
| 4,667,082 A | 5/1987 | Shibata | |
| 4,675,502 A * | 6/1987 | Haefner et al. | 219/124.34 |
| 5,001,324 A * | 3/1991 | Aiello et al. | 219/121.63 |
| 5,045,668 A * | 9/1991 | Neiheisel et al. | 219/121.83 |
| 5,877,960 A * | 3/1999 | Gross et al. | 700/175 |
| 6,084,223 A * | 7/2000 | Dietz et al. | 219/617 |
| 6,621,060 B1 * | 9/2003 | Nantel et al. | 250/201.4 |
| 6,791,057 B1 * | 9/2004 | Kratzsch et al. | 219/121.63 |
| 2009/0266989 A1 | 10/2009 | Schwarz | |
| 2011/0180521 A1 * | 7/2011 | Quitter et al. | 219/121.73 |
| 2012/0234805 A1 * | 9/2012 | Schwarz | 219/121.63 |

FOREIGN PATENT DOCUMENTS

DE   198 52 302 A1   5/2000
DE   10120251 A1   11/2002

(Continued)

*Primary Examiner* — Sang Y Paik
(74) *Attorney, Agent, or Firm* — Muncy, Geissler, Olds & Lowe PC (57) ABSTRACT

A laser processing head for processing a workpiece by means of laser beam, including a housing through which a beam path for the laser beam is led and which has a focusing optical unit for focusing the laser beam onto a joint of the workpiece to be processed. A light cutting device is fitted to the housing and has a light source for generating a light line on the workpiece. A camera is arranged in an observation beam path in front of the camera such that the camera images the light line at the location to be joined and also the portion. The system also includes an image processor which calculates a minimum distance between the stored target trajectory and the current welding path midpoint.

18 Claims, 6 Drawing Sheets

(56) References Cited

FOREIGN PATENT DOCUMENTS

| | | |
|---|---|---|
| DE | 10126725 A1 | 12/2002 |
| DE | 10 2004 051876 A1 | 4/2006 |
| DE | 10 2006 004919 A1 | 8/2007 |
| DE | 10 2007 027377 A1 | 1/2008 |
| DE | 10 2006 049627 A1 | 4/2008 |
| DE | 10 2008 047140 A1 | 3/2010 |
| EP | 0 707 920 B1 | 4/1996 |
| EP | 0 770 445 A2 | 5/1997 |
| EP | 1099506 A1 | 5/2001 |
| EP | 2062674 A1 | 5/2009 |
| JP | 2000-263266 A | 9/2000 |
| WO | WO 2007/088122 A1 | 8/2007 |

* cited by examiner

LASER PROCESSING HEAD AND METHOD FOR PROCESSING A WORKPIECE BY MEANS OF A LASER BEAM

The invention relates to a laser processing head and a method for processing a workpiece by means of a laser beam, in particular for joining by means of welding or soldering.

A laser processing head can be used to process a workpiece by using a laser beam, it being possible, by way of example, to join a gap in a workpiece or between two workpieces by welding or soldering. In this case the laser beam must strike the gap to be joined, that is to say the butt joint, of the joining partners to be welded. To this end, use is made of seam tracking systems that are based, for example, on triangulation sensors.

During a welding operation, these systems use a light cutting device that is fitted on a laser processing head. In this case, the light cutting device uses a laser beam to project a light fan onto the workpiece, in order to generate a light line thereon. In this method, the position of the seam joint is determined by measurement in advance. In order to test whether welding really has taken place, and whether the weld seam is situated at the correct location, the position of the seam joint determined in advance is compared with the weld seam position that is determined with a second camera with the aid of a second light line. The second light line in this case runs behind the joint, that is to say the point of impingement of the laser beam on the workpiece. Such a system is described, for example, in EP 0 770 445 A2.

In this method, the second light line for measuring the weld seam is arranged a few millimeters behind the tool center point (TCP), that is to say the point where the laser impinges on the workpiece. Particularly in the case of curvilinear weld seam profiles, this gives rise to swinging-out movements, with the result that the minimum curve radii are limited by the distance between the light lines running in front and running behind, since the fields of view of the cameras that detect the light lines are likewise limited. Depending on the curve profile or the distance between the light lines, the swinging-out movements of the light lines running in front and running behind are different, and therefore cannot be brought under control with a swivel axis.

DE 10 2006 049 627 A1 discloses a method and a device for the fine positioning of a workpiece with the aid of a manipulating unit. Given a butt joint of two workpieces to be welded, in this method a gap to be detected in front of a processing point in the movement direction is evaluated in order to acquire a desired movement path, there being undertaken to this end a grayscale image evaluation of the images, recorded using incident light, of a camera in order to acquire the contour position. The manipulating unit then travels along the contours to be tracked within the measuring range of a sensor that determines the actual movement of the point where the laser impinges on the workpiece, an actuator for fine positioning connected between manipulating device and laser processing head being used to vary the laser beam impingement point appropriately in order to compensate deviations in the desired movement path of the manipulating device.

EP 0 707 920 B1 describes a compact laser processing head for laser material processing with integrated online path control. With this laser processing head, actual path data are passed to a CNC controller in order to acquire geometry and/or to track contours, so as to be fed to a processing unit at the same time. The processing unit compares the actual path data with desired path data from a protocol memory, the desired path data having been determined in advance with the aid of a master part. Given a prescribable deviation, the processing unit is used to generate an error signal at a system controller when the actual path data deviate from the desired path data beyond the prescribed measure. A sensor for geometry acquisition and/or tracking contours is supported such that it can rotate about at least 360° in order to achieve a full 3D capability.

DE 10 2006 004 919 A1 discloses a laser beam welding head that is equipped, for the purpose of welding metal parts with at least one beam path for a welding operation and means for optically acquiring the position of the weld seam at a first measuring position. The means for optical acquisition of the weld seam enable an arrangement of the first measuring position in front of the welding position of the welding beam forward in the welding direction, and produce a correction signal for correcting the welding position of the welding beam as a function of a lateral deviation of the weld seam from a desired position. The distance of the first measuring position in front of the welding position of the welding beam is selected so that the correction signal produced can be used directly, in particular without prior calculation by driving means for correcting the welding position of the welding beam.

It is the object of the invention to provide a laser processing head and a method for processing a workpiece by means of a laser beam, in the case of which head and method, butt joints with small radial curvature of joining partners to be welded or to be soldered can be joined and monitored in a simple way.

This object is solved by the laser processing head according to claim 1 and by the method for processing a workpiece by means of a laser beam in accordance with claim 14. Advantageous embodiments and developments of the invention are presented in the dependent claims.

According to the invention, there is provided for the purpose of processing a workpiece by means of a laser beam a laser processing head comprising a housing through which a beam path for the laser beam is guided, and which has a focusing optics for focusing the laser beam onto a joint of the workpiece to be processed, a light cutting device fitted on the housing having a light source for generating on the workpiece a light line which cuts a location to be joined at a predetermined distance, a camera with an optical bandpass filter arranged in an observation beam path in front of the camera, the light source having an at least local emission maximum in the wavelength passband of the bandpass filter, and the optical bandpass filter being configured so that the laser beam is not transmitted, and the camera imaging the light line at the location to be joined as well as the portion—transmitted by the bandpass filter—of the process light of a melt pool, produced by the laser beam impinging on the workpiece to be processed, at the joint at regular time intervals, and a processing unit with a memory for receiving the recorded image data from the camera, which is designed to determine, by image processing of the received image data, the intersection point of the light line with the location to be joined, as well as the midpoint of the melt pool at the joint, to store the intersection points between light line and location to be joined as target trajectory in the memory, and to determine a minimum distance between the stored target trajectory and the current melt pool midpoint.

Thus, for the purpose of joining by welding or soldering there is provided a laser processing head in which a location to be joined is detected by means of a laser light line running in front such that irregularities, recorded by means of a camera, in the light line that occur when the light line is crossed by the location to be joined, that is to say by the butt joint, are evaluated. The intersection points, detected at different instants, between light line and location to be joined are then stored in a memory as target trajectory. The same camera is used to observe the melt pool, or keyhole, produced by the laser beam striking the workpiece, and the midpoint of the keyhole is calculated by image processing.

In order to make practical use of the optical bandpass filter, the latter is expediently an interference filter, in particular a Fabry-Perot filter, the half value width of the wavelength passband preferably being less than 50 nm, with particular preference less than 20 nm, and less than 10 nm in particular.

Thus, when the workpiece is being processed, in particular during welding, the laser processing head is used to determine a target trajectory that serves as a desired path onto which the keyhole running behind is controlled by means of an actuator. On the other hand, the desired path serves for checking the actuator as to whether the latter is guiding the welding point around the desired path within a predetermined range. Given an actuator failure, it is therefore possible to output an error report when the keyhole no longer runs along on the prescribed target trajectory.

According to the invention, it is particularly advantageous here that the emitted radiation of the melt pool is recorded and evaluated by the camera in order to determine the midpoint of the current welding point without recourse to the reflected laser radiation. That is to say, it is possible thereby to determine the position of the melt pool which produces the weld seam, and to guide it according to a target trajectory. Checking of the weld seam produced by a laser line running behind is therefore eliminated, thereby enabling tight path radii.

In order to check the correct position of the weld seam to be produced along a butt joint, it is expedient when the inventive laser processing head further has a comparator which is designed to output an error report upon overshooting of the minimum distance between target trajectory and current welding midpoint beyond a prescribed distance value.

In order to optimally guide the weld seam to be produced along a butt joint to be welded or to be soldered, it is advantageous when the inventive laser processing head further has an actuator which is designed to control the minimum distance between target trajectory and current welding midpoint to a minimum value, that is to say toward zero by moving the laser beam transverse to a movement direction of the laser processing head by a controlling distance (a).

It is expedient here for the actuator to be designed to move the laser beam perpendicular to the movement direction by the controlling distance (a).

To position the laser beam easily and accurately relative to the housing of the laser processing head, it is expedient when, for the purpose of adjusting the laser beam transverse to the movement direction of the laser processing head, the actuator is designed to move an optical component, in particular a deflecting mirror, inside the housing of the laser processing head.

When storing the determined intersection points in order to determine a target trajectory, it is advantageous when the processing unit is designed to transform the coordinates of the intersection points between light line and location to be joined, as well as of the melt pool midpoints from the moving reference system of the imaging camera into a reference system in the plane of the workpiece, the target trajectory of the intersection points being stored in the memory in the reference system of the workpiece.

To simultaneously record both the light line with low light intensity and the melt pool in the workpiece, which has a high light intensity, it is particularly advantageous when the camera comprises an image recording device that is designed to process the image data by means of an HDR method. It is expedient here to arrange in front of the camera a filter that is substantially transparent to the wavelength region of the generated light line as well as to the process radiation of the melt pool, but is substantially not transparent to the wavelength of the working laser beam projected onto the workpiece.

To optimally align the camera image produced by the camera with the laser beam striking the workpiece, it is particularly expedient when, furthermore, there is provided in the housing of the laser processing head a beam splitter that can be used to couple an observation beam path of the camera coaxially into the laser beam path.

It is, however, also possible for the camera to be fitted on an outer side of the housing.

In order to be able to determine in a simple way a distance between the focusing optics and the workpiece by means of triangulation, it is expedient when the light cutting device is designed to generate by means of the light source a light fan that strikes the workpiece to be processed obliquely relative to the optical axis of the laser beam so that a light line is generated on the workpiece.

Given a rectilinear movement of the laser processing head along the workpiece, it is advantageous when the light line projected onto the workpiece is straight and runs perpendicular to the movement direction of the laser processing head.

To determine the target trajectory given a curvaceous butt joint, and given an adaptation of the movement direction of the laser processing head in accordance with the profile of the butt joint, it is advantageous when the light line projected onto the workpiece runs circularly around the point of impingement of the laser beam.

Owing to the high intensity and the slight beam expansion of laser light, it is advantageous when the light source is a laser, in particular a semiconductor laser.

According to the invention there is also provided a robot device that has an inventive laser processing head as described above, the latter being designed to move the laser processing head so that the weld midpoint is guided along the target trajectory, the current movement direction of the laser beam striking the workpiece being set so that said movement direction points away from the current weld midpoint tangentially relative to the target trajectory. That is to say, it is possible thereby for the movement direction of the laser processing head or of the laser beam to be adapted optimally to the profile of the butt joint to be joined.

According to the invention, there is further provided a method for processing a workpiece by means of the inventive laser processing head, which has the following steps: generating inside an operating area of the workpiece a light line that cuts a location to be joined at a predetermined distance, imaging the light line at the location to be joined as well as a melt pool, produced by the laser beam impinging on the workpiece, at the joint at regular time intervals by means of the camera, and processing the image data produced by the camera, having the steps of: determining an intersection point of the light line with the location to be joined, as well as the midpoint of the melt pool area, storing the intersection points determined at different instants as target trajectory in a memory, and determining a minimum distance between target trajectory and current melt pool midpoint.

The inventive method expediently comprises the step of controlling the minimum distance between target trajectory and current melt pool midpoint by moving the laser beam transverse to the movement direction of the laser beam to a minimum value by a controlling distance (a).

The invention is explained in more detail with the aid of the drawings, in which.

Mutually corresponding components are provided with the same reference symbols in the various figures of the drawings.

Figure 1:
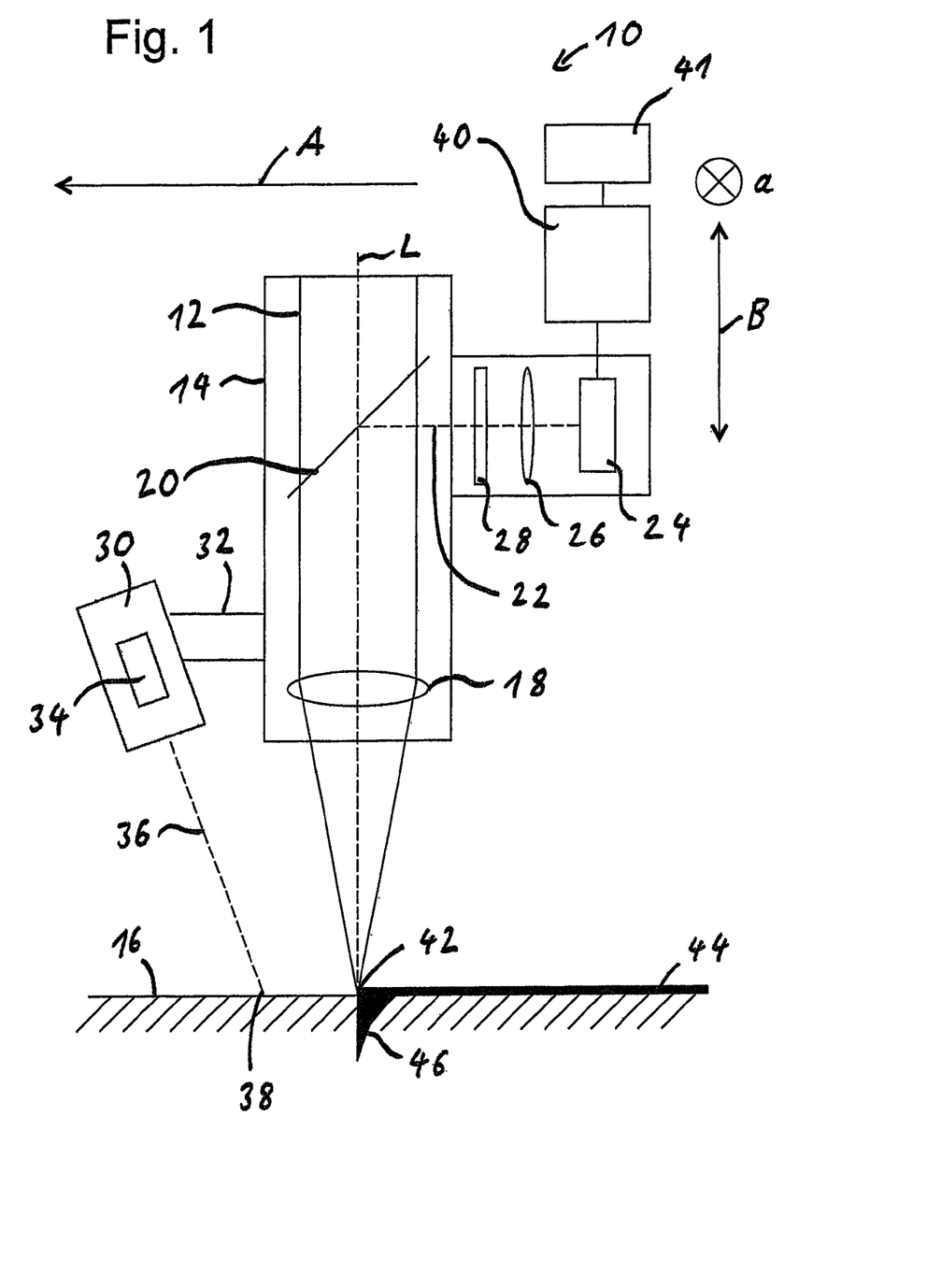
FIG. 1 shows a greatly simplified schematic view of a laser processing head in accordance with an exemplary embodiment of the invention.

FIG. 1 shows a greatly simplified view of a laser processing head 10, in particular a laser processing head, in accordance with an exemplary embodiment of the invention as it is used with laser processing machines or laser processing systems. Here, a working laser beam 12 coming from the laser processing machine is directed through a housing 14 of the laser processing head 10 onto a workpiece 16, and focused by means of a focusing optics 18 onto the workpiece 16, as is indicated by the optical axis L. When led to the laser processing head 10 by means of an optical fiber, the working laser beam 12 can be expanded by a collimator optics on the basis of coupling the laser beam out of the optical fiber.

A beam splitter 20 is arranged in the housing 14 of the laser processing head 10 in the passage area of the working laser beam 12 so that an observation beam path 22 (indicated by its optical axis) of a camera 24 is coupled coaxially into the beam path of the working laser beam 12. An imaging optics 26 and an optical bandpass filter 28 are arranged in front of the camera 24 in the observation beam path 22. In the exemplary embodiment of the invention shown in FIG. 1, the observation beam path 22 of the camera 24 is directed onto a working area of the workpiece 16 via the beam splitter 20. However, it is also possible to fit the camera 24 with an observation optics on an outer side of the housing 14 of the laser processing head 10, it being necessary, however, to ensure that the image, recorded by the camera 24, of the working area of the workpiece 16 is also moved synchronously with the housing 14 and, in particular, with the focusing optics 18 when there is a movement of the laser processing head 10.

Arranged on an outer side of the housing 14 is a light cutting device 30 that is mounted on a side of the housing 14 by means of a holder 32 that is located at the front upon a movement of the laser processing head 10 in its movement direction (indicated by the arrow A). The light cutting device 30 has a light source 34 by which a light fan 36 is projected in the direction of the workpiece 16 in order to generate a light line (shown in FIGS. 2A, 3A and 3B) on the surface thereof inside the working area of the laser processing head 10.

Because of its high intensity and a low intrinsic beam widening, a laser light source is suitable as light source 34 of the light cutting device 30, said light source can be a semiconductor laser diode. By way of example, use can be made to this end of AlGaInP laser diodes with multi-quantum-well structures that have an emission maximum in a wavelength region between 635 nm and 670 nm. Thus, for example, it is possible to use a laser diode with an emission wavelength of 658 nm and an emitted power of 66 mW.

The optical bandpass filter 28 is arranged in front of the camera 24, which is preferably a CCD camera with logarithmic characteristic. According to the invention, in this case the wavelength passband of the optical bandpass filter 28 is adapted to the at least local emission maximum of the light source of the light cutting device 30. Here, the half width of FWHM (full width at half maximum) of the wavelength passband of the filter 28 is to be selected so that the maximum of the light source 30 as well as a spectral portion of the process light that is emitted by the melt pool, described below in more detail, in the workpiece 16, are simultaneously situated with adequate intensity within the spectral passband of the optical bandpass filter 28, it being ensured that the wavelength of the working laser beam 12 is situated outside the spectral passband of the bandpass filter 28. Here, the half value width is preferably less than 50 nm, with particular preference less than 20 nm, and less than 10 nm in particular. The optical bandpass filter 28 is preferably a Fabry-Perot filter or Fabry-Perot etalon, this type of filter passing electromagnetic waves of a specific frequency range, and the remaining frequency components being extinguished by interference. With regard to the half value width of the optical bandpass filter 28, it is advantageous when said range is as narrow as possible in order to produce as little disturbance as possible to the camera image by reflections of the laser beam 12 during operation of the laser processing head 10.

The laser processing head 10 further comprises a processing unit 40 connected to the camera 24, and an actuator 41 that is connected to the processing unit 40 and whose function will be described below more precisely.

Figure 2A:
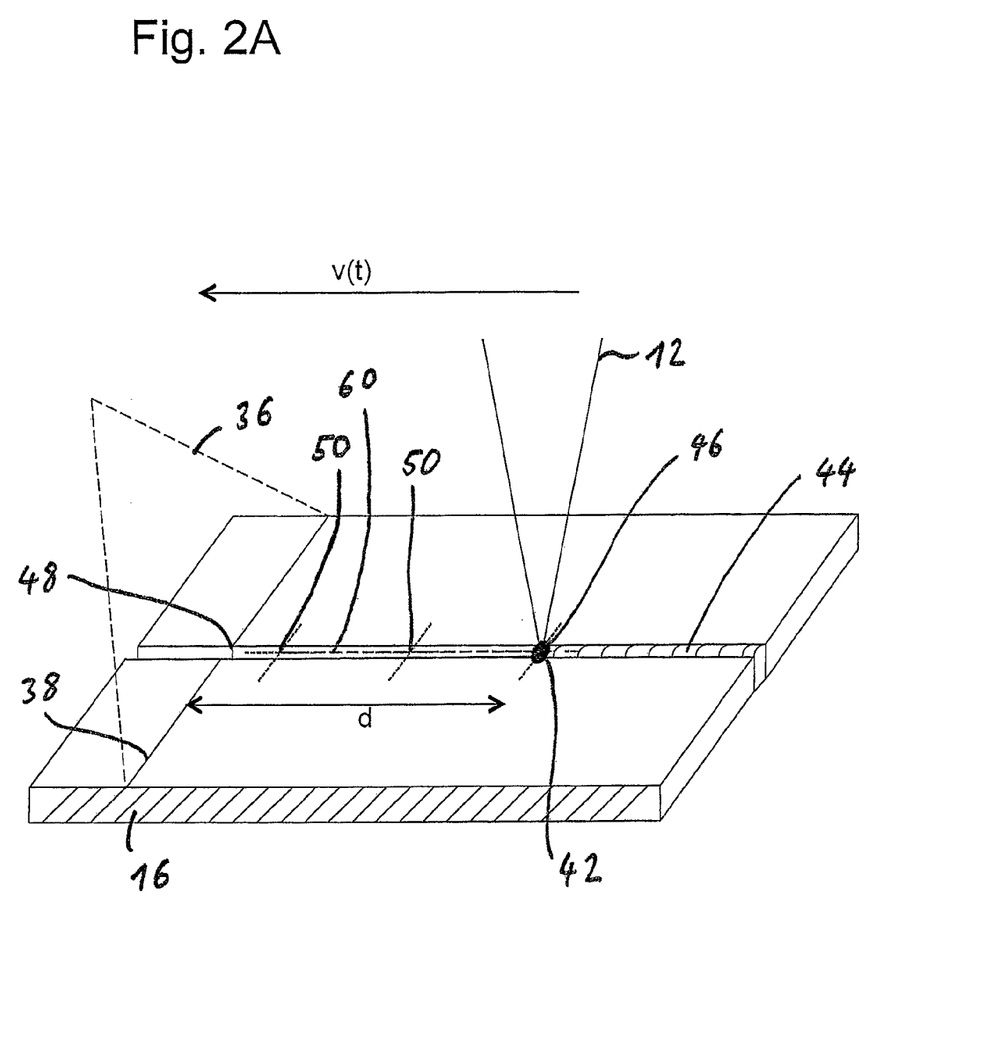
FIG. 2A shows a greatly simplified perspective partial view of the workpiece during a joining process at a first instant.
Figure 2B:
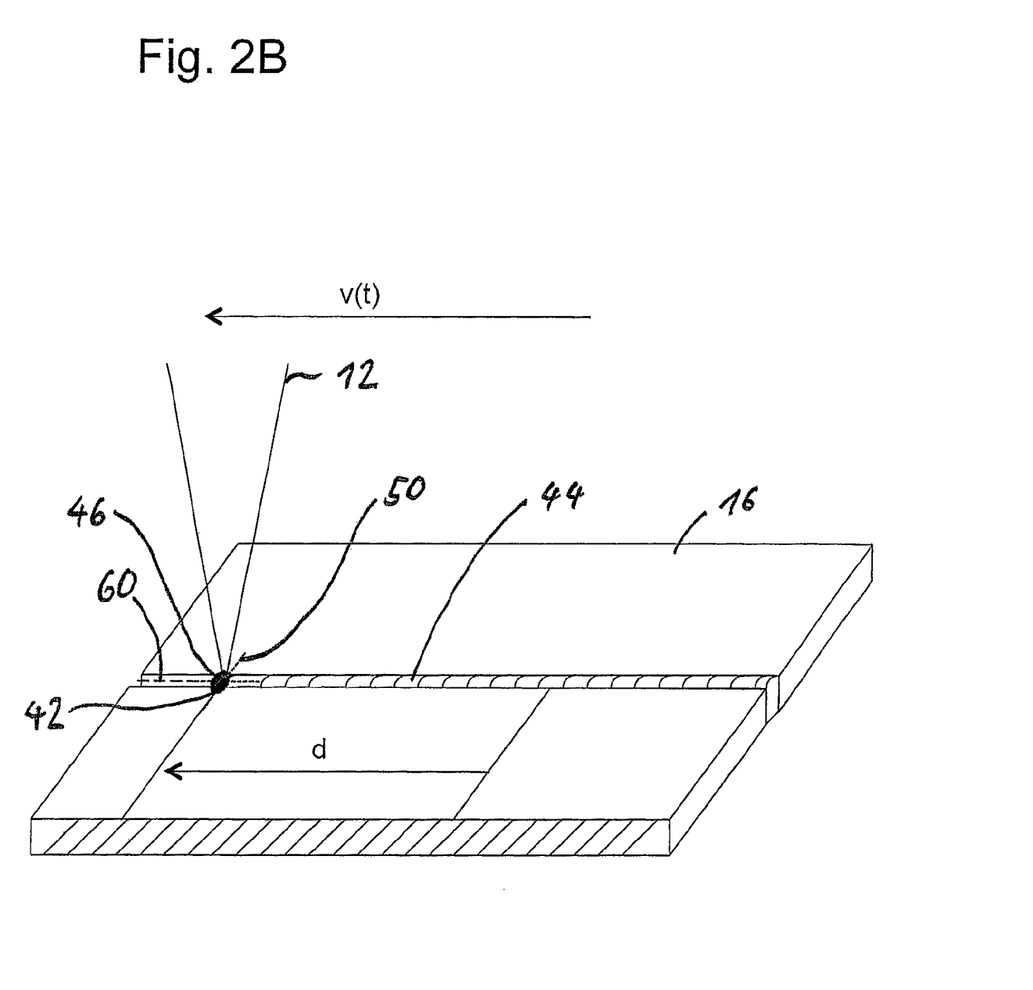
FIG. 2B shows a greatly simplified perspective partial view of the workpiece during a joining process at a second instant.
Figure 3A:
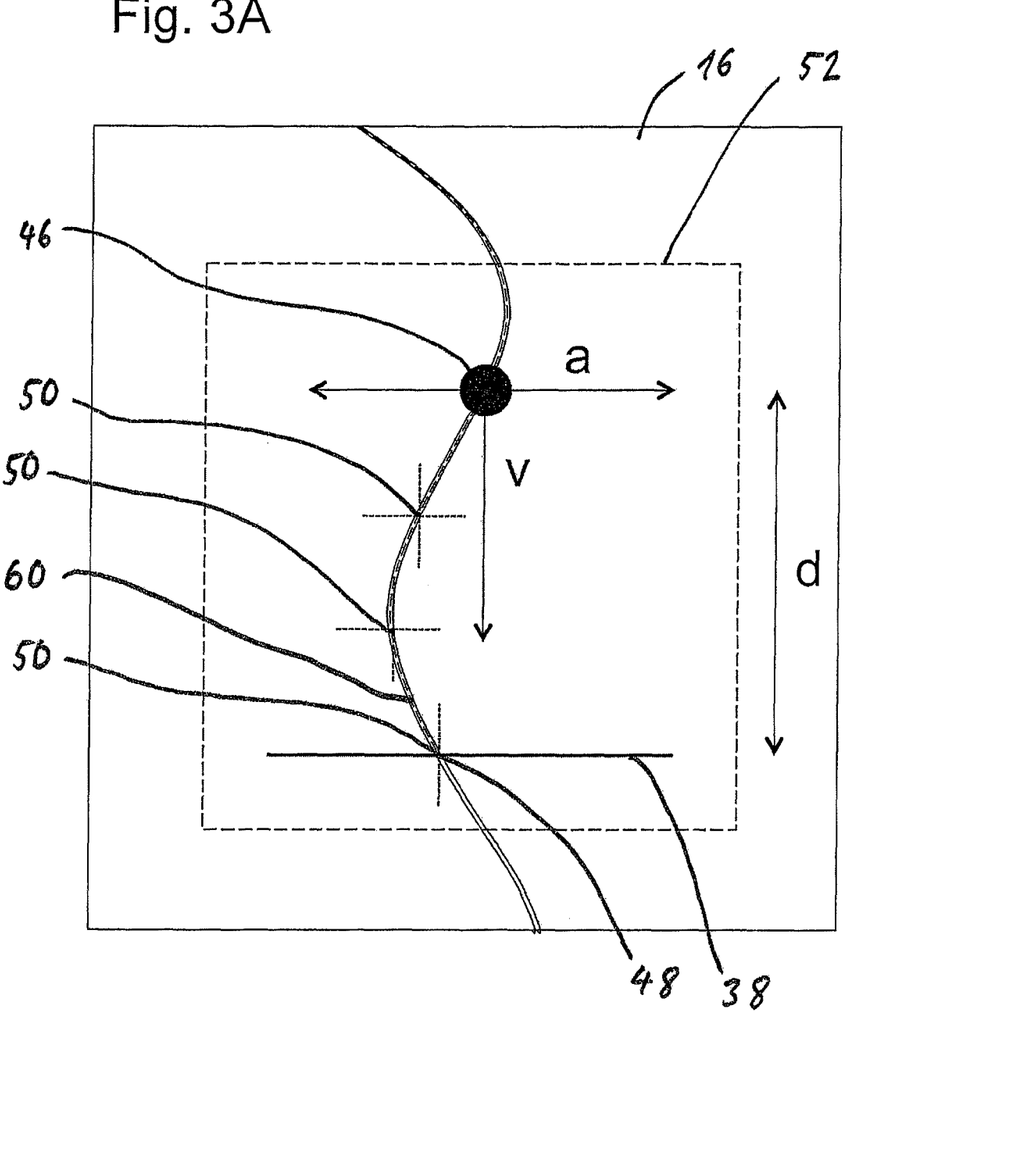
FIG. 3A shows a greatly simplified plan view of the workpiece during a joining process with the use of a straight light line that is projected onto the workpiece.
Figure 3B:
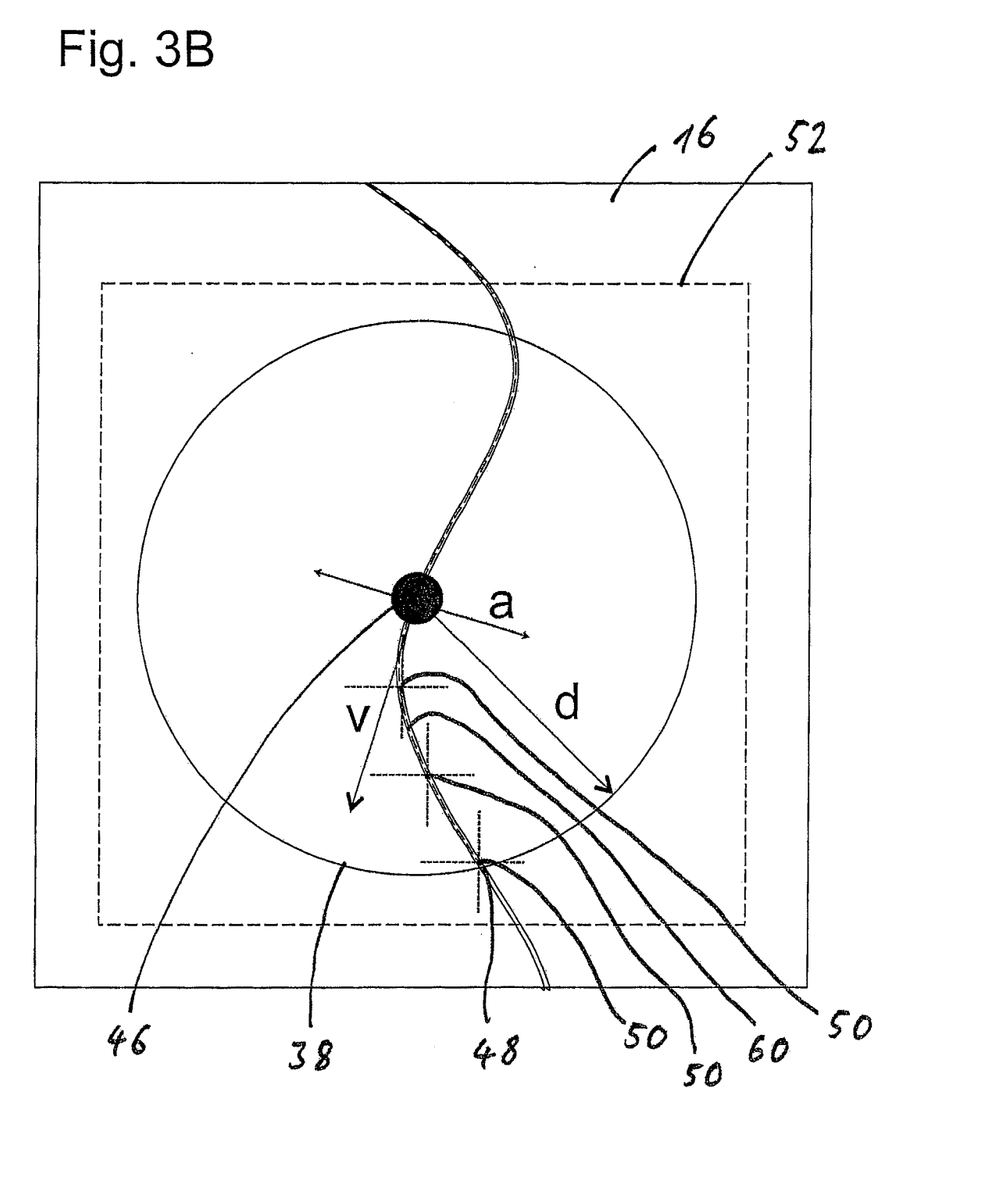
FIG. 3B shows a greatly simplified plan view of the workpiece during the joining process with the use of a circular light line that is projected onto the workpiece.

Although, as shown in FIGS. 2A, 2B and 3A, the light cutting device 30 projects onto the workpiece 16 a straight light line 38 that is substantially perpendicular to the movement direction of the laser processing head 10, it is, for example, also conceivable for the light cutting device 30 to project onto the workpiece 16 a conical light fan around the focal point of the laser beam 12, in order to generate a circular or elliptical light line 38, as shown in FIG. 3B.

The aim below is now to explain the function of the inventive laser processing head 10 with the aid of FIGS. 2A, 2B, 3A and 3B.

During a joining process carried out by the laser processing head 10, which can be a welding or soldering process, as shown by the arrow A indicated in FIG. 1 the laser processing head 10 is moved over the workpiece 16 to be joined (which can be composed of two sheets, or similar elements, to be joined to one another) at a speed v(t), the focused laser beam 12 striking a respective joint 42 and producing a joint seam 44 which interconnects the workpiece parts shown in FIG. 2A, on the basis of the welding operation.

When the focused laser beam 12 impinges on the joint 42, the material of the workpiece 16 is fused in both parts to be joined, the result being to produce at the joint 42 a melt pool 46 that is usually also termed a keyhole. Because of the fused material of the workpiece 16, which is usually metal, the melt pool 46 emits a thermal radiation corresponding to the temperature of the melt pool 46 produced.

The light line 38 of the light cutting device 30 is projected onto the workpiece 16 so that it runs in front of the focal point of the laser beam 12, that is to say the respective joint 42. The light cutting device 30 is fitted in this case on the housing 14 of the laser processing head 10 so that the light fan 36 strikes the workpiece 16 to be processed obliquely relative to the optical axis of the laser beam 12, and so when the housing 14 is moved up and down along the optical axis L (see arrow B), the projected light line 38 on the workpiece 16 moves to and fro relative to the working laser beam 12 striking the workpiece 16.

There is thus an increase in a distance d between the light line 38 and the point at which the laser beam 12 impinges, which does not have to correspond to the real point where the laser beam 12 impinges, but can also be a virtual fixed point in the image coordinate system of the camera 24 arranged fixedly with respect to the light cutting device 30) when the laser processing head 10 is moved downward, and the distance d between the light line 38 and the point where the laser beam 12 impinges on the workpiece 16 is reduced when the laser processing head 10 is moved upward.

Since the focus of the working laser beam 12 is intended, for an optimum joining process, to run always at a predetermined height along the location to be joined, the processing unit 40 is used to evaluate the light line 38 acquired by the camera with regard to its distance d from the point where the laser beam 12 impinges, and, by controlling the actuator 41, for an upward or downward movement of the housing 14 (see arrow B), the light line 38 is controlled to a predetermined distance d which, in turn, corresponds to an optimum focal position of the working laser beam 12 at the joint 42. This control mechanism can be applied in the same way for a conical light fan which generates a circular light line 38 on the workpiece 16, as shown in FIG. 3B.

In an inventive laser processing operation, the camera 24 is used to record at regular time intervals both the light line 38 projected onto the workpiece, and the melt pool 46 produced by the laser beam 12 impinging on the workpiece 16 on the basis of the emitted thermal radiation. The camera 24 is preferably designed to process recorded images with a high dynamics as regards the recorded light intensity. Camera devices which use HDR (High Dynamic Range) methods are particularly well suited to this purpose.

Moreover, the camera 24 can have a logarithmic characteristic so that the high intensity process light, which is passed by the optical bandpass filter 28, can be recorded by the camera 24 simultaneously with the light line 38, which is of low intensity relative to the process light of the melt pool 46. Since the optical bandpass filter 28 passes light only within a small wavelength region and filters out the wavelength region of the working laser beam 12, the inventive laser processing head 10 can be used to acquire the outline of the melt pool 46 and the contour of the light line 38 without the disturbance of reflections of the laser beam 12 or other disturbing influences.

A welding process at a first instant is shown in FIG. 2A. The light line 38 runs over the workpiece 16 and goes beyond the butt joint or the existing gap between the workpiece parts, the light line 38 crossing the location 48 to be joined at the place where the butt joint runs. By using the processing unit 40 to process the image data recorded by the camera 24, an intersection point 50 between the location 48 to be joined and the light line 38 is determined. Here, the profile of the light line 38 over the workpiece 16, which is planar as a rule, is analyzed and the intersection point 50 is located as the point at which the light line 38 shows a jump or similarly comparable irregularities.

Furthermore, the process light, transmitted by the bandpass filter 28, of the melt pool 46, and thus the contour of the melt pool 46, are imaged, the midpoint of the melt pool 46 at the joint 42 being determined by image processing in the processing unit 40. The outline of the melt pool 46 can, on the one hand, be approximated as circular, however it is, on the other hand, also possible to determine the geometric centroid of the imaged melt pool surface.

Figure 4:
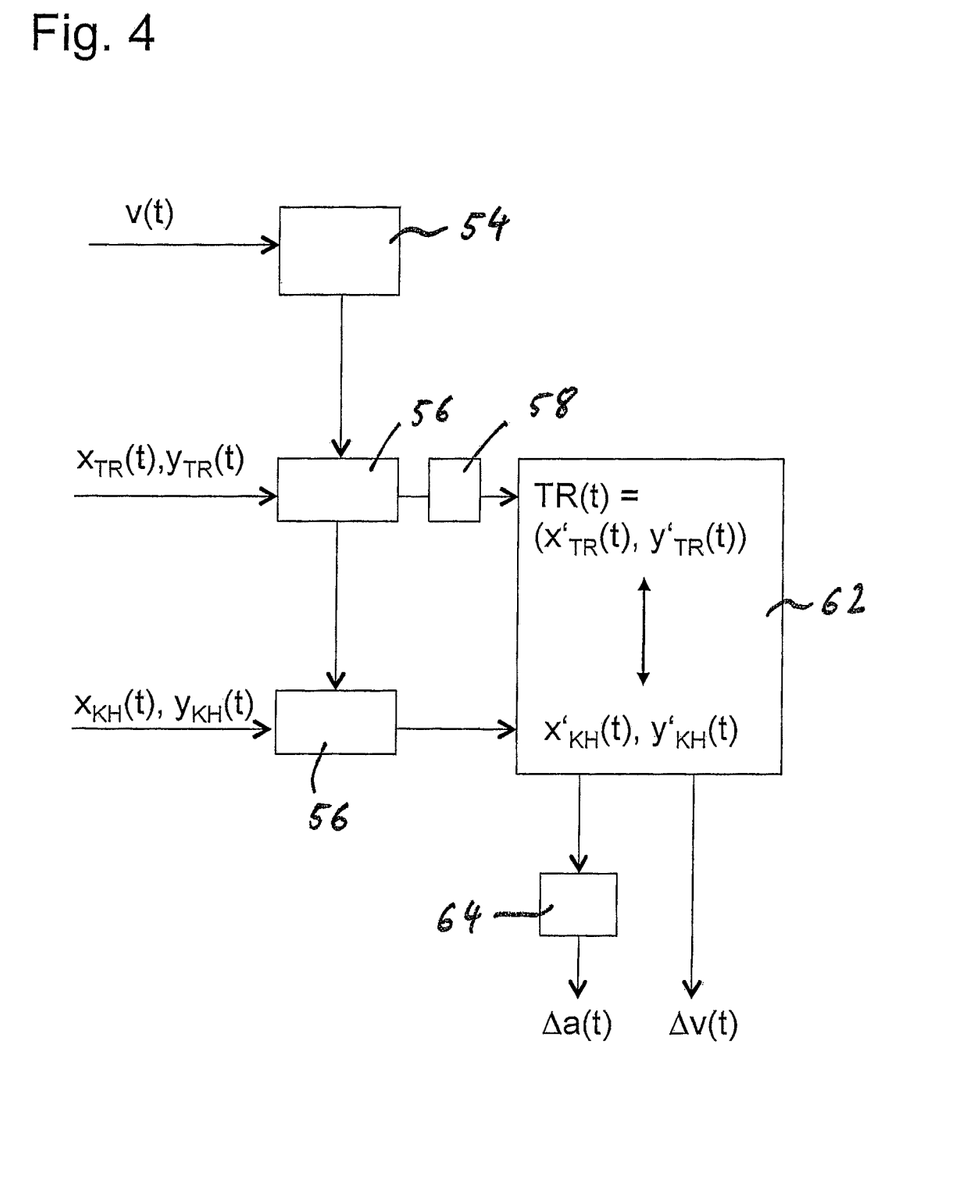
FIG. 4 shows a block diagram of a processing unit of the laser processing head in accordance with the invention.

The intersection points 50 determined by the processing unit 40 are present initially at a specific instant in the coordinates of the image surface 52 (FIGS. 3A and B) recorded by the camera 24. By time integration of the feed rate v(t) of the laser processing head 10, a translation vector is firstly calculated at a specific instant and, in addition, the orientation of the image recording surface 52 relative to the workpiece 16 is determined, as a result of which it is possible to transform the coordinates of the intersection points 50 into a coordinate system fixed relative to the workpiece 16. As is shown in FIG. 4, for this transformation the processing unit 40 has means 54 for determining the position and orientation of the moving reference system of the imaging camera, and means 56 for transforming the coordinates $x_{TR}(t)$, $y_{TR}(t)$ of the intersection points 50 or the coordinates $x_{KH}(t)$, $y_{KH}(t)$ of the melt pool midpoints of the melt pool 46 from the moving reference system of the imaging camera into a reference system in the plane of the workpiece surface, the coordinates $x'_{TR}(t)$, $y'_{TR}(t)$ of the intersection points 50 and $x'_{KH}(t)$, $y'_{KH}(t)$ of the melt pool midpoints being produced.

After the transformation of the intersection points 50 into a reference system fixed relative to the workpiece 16, the intersection points 50 are stored in a memory 58 (FIG. 4), a target trajectory 60 thereby being formed by interpolation of the intersection points 50. This target trajectory 60 forms a virtual desired path for the following point at which the laser beam 12 impinges on the workpiece 16, that is to say the tool center point or TCP. Depending on the computing capacity of the processing unit 40, the target trajectory 60 develops somewhat behind the light line 38.

According to the invention, the production of a high quality joint seam 44 is checked, or a constant quality is ensured by control, by comparing the position of the current melt pool midpoint 46 with the position of the target trajectory 60, as is to be explained below.

The simplest case of a butt joint to be joined or of a gap in the case of a workpiece 16 is shown in FIGS. 2A and 2B. The feed rate v(t) of the laser processing head 10 and thus of the laser beam 12 runs straight along a rectilinear joint and produces a rectilinear weld seam 44. After traversing the controlling distance d (shown in FIG. 2B) between the light line 38 and the point of impingement of the laser beam 12, the laser beam 12 has reached the location 48 to be joined, which is shown in FIG. 2A and has been provided with a virtual intersection point 50 and stored in the memory 58. By comparing the stored coordinates of the intersection points 50 in the reference system of the workpiece 16 of the intersection point 50 of the target trajectory 60 with the coordinates of the current melt pool midpoint 46, it can be checked whether the melt pool 46 is being guided without error along the target trajectory 60. However, it is also possible to adjust the melt pool 46 to the target trajectory 60 by using an actuator, for example the actuator 41 that reflects the laser beam 12 transverse to the movement direction by a controlling distance a.

A first exemplary embodiment of a laser processing operation is illustrated according to the invention in FIG. 3A.

In this operation, a rectilinear movement is performed with a feed rate v of the laser processing head 10, the actuator 41 being designed to move either the entire laser processing head 10 (with the light cutting device 30) or the point where the laser beam 12 impinges on the workpiece 16 to and fro by a controlling distance a. The deflecting movement of the laser beam 12 with the controlling distance a runs here transverse to the movement direction of the laser processing head 10, the deflecting movement preferably being perpendicular to the movement direction of the laser processing head 10 in order to achieve as simple a control as possible. The laser line 38 projected into the workpiece 16 runs at a distance d in front of the point of impingement of the laser beam 12 and is preferably situated perpendicular to the movement direction v(t) of the laser processing head 10.

The actuator 41 can be a conventional mechanical adjusting device that either moves the entire laser processing head 10, or else it is also possible to couple the actuator 41 for adjusting the laser beam 12 to an optical component that is installed in the beam path of the laser beam 12 in the laser processing head 10. Particularly suitable for this purpose is a deflecting mirror (not shown) that can be used to move the laser beam simply and quickly relative to the workpiece 26 without adjusting massive components. If the laser beam 12 is moved relative to the light cutting device 30, which is mounted fixedly on the housing 14, this should be taken into account in calculating the target trajectory 60.

As shown in FIG. 4, use is made for this purpose of a calculator unit 62 of the processing unit 40 which determines a minimum distance between the stored target trajectory 60 and a current melt pool midpoint. The minimum distance can be used in a control operation as an actual variable whose value is to be minimized. However, it is also possible to provide in the processing unit 40 a comparator 64 (FIG. 4) that outputs an error report upon overshooting of the minimum distance between target trajectory 60 and current welding midpoint beyond a prescribed distance value.

A further exemplary embodiment for an inventive laser processing operation with use of the associated inventive laser processing head 10 is shown in FIG. 3B.

Instead of a rectilinear laser line 38, in this exemplary embodiment use is made of a laser line 38 that runs in the shape of a circle or ellipse about the point where the laser beam 12 impinges, that is to say about the midpoint of the melt pool 46. This geometry of the laser line 38 (which can, for example, also be designed in the shape of a semicircle) has the advantage that in the case of melt pools of extreme curvature the intersection point 50 between laser line 38 and location 48 to be joined can always be acquired, and the distance between currently acquired location 48 to be joined and the midpoint of the melt pool 46 always has approximately the controlling distance d.

This shape of the laser line is particularly suitable for an inventive variant for controlling the movement of the laser processing head 10 which consists in that in addition to the deflection a for guiding the melt pool 48 on the target trajectory 60 by a controller the movement direction with the feed rate v is also adapted to the acquired target trajectory 60. It is possible hereby, for example, to set the current movement direction of the laser beam 12 striking the workpiece in such a way according to the invention that said direction points away tangentially relative to the target trajectory 60 from the current welding midpoint. Thus, when the laser processing head 10 moves a tangent is applied to the target trajectory 60 at the point where the midpoint of the melt pool 46 is situated and which coincides with the target trajectory 60 given a suitable control, said tangent prescribing the direction for the current movement direction v(t) of the laser processing head 10.

In a further variant of the control of the movement direction of the laser processing head 10, there is formed between the current welding midpoint and the currently acquired intersection point 50 a connecting straight line that prescribes the current movement direction of the laser processing head 10. Formation of the straight line between welding midpoint and intersection point 50 is, however, not limited to the currently acquired intersection point 50—it is, for example, possible to select an intersection point 50 at a prescribed radial distance from the melt pool midpoint. Nor, moreover, is the method of controlling the movement direction of the laser processing head 10 limited to the use of a circular or elliptical laser line 38—it is also, for example, possible to undertake to control the movement direction with a straight laser line 38, as is shown in FIG. 3A.

A robot device (not shown) that guides the inventive laser processing head 10 along the target trajectory 60 can be provided to guide the laser processing head.

Using the inventive laser processing head 10 and the inventive method for processing a workpiece 16 by means of the inventive laser processing head 10, it is possible to implement smaller swinging-out movements on the basis of the smaller distance between position determination of the butt joint, that is to say the location 48 to be joined, and the determination of the seam position at the tool center point, that is to say the position of the melt pool 46, in particular the position of the midpoint of the melt pool 46, that is to say the melt pool midpoint. Moreover, the swinging-out movements of the light line 38 can be performed in advance with one axis, there being consequently no further need for a second swivel axis. It is thereby possible to weld and monitor smaller curve radii. Moreover, it is possible to infer the laser beam power from the measurement of the process radiation of the melt pool 46, that is to say of the keyhole, for example in the form of grayscale values.

The invention claimed is:

1. A laser processing head for processing a workpiece by means of a laser beam, comprising:
    a housing through which a beam path for the laser beam is guided, and which has a focusing optics for focusing the laser beam onto a joint of the workpiece to be processed,
    a light cutting device fitted on the housing having a light source for generating on the workpiece a light line which cuts a location to be joined at a predetermined distance (d) from the joint,
    a camera with an optical bandpass filter arranged in an observation beam path in front of the camera, the light source having an at least local emission maximum in the wavelength passband of the bandpass filter, and the optical bandpass filter being configured so that the laser beam is not transmitted, and the camera imaging the light line at the location to be joined as well as the portion transmitted by the bandpass filter of the process light of a melt pool, produced by the laser beam impinging on the workpiece to be processed, at the joint at regular time intervals, and
    a processing unit with a memory for receiving the recorded image data from the camera, which is designed
        to determine, by image processing of the received image data, the intersection point of the light line with the location to be joined, as well as the midpoint of the melt pool at the joint,
        to store the intersection points between light line and location to be joined as target trajectory in the memory, and
        to determine a minimum distance between the stored target trajectory and the current melt pool midpoint.

2. The laser processing head as claimed in claim 1, wherein the optical bandpass filter is an interference filter.

3. The laser processing head as claimed in claim 2, wherein the interference filter is a Fabry-Perot filter.

4. The laser processing head as claimed in claim 1, wherein the optical bandpass filter has a wavelength passband whose full width at half maximum is preferably less than 50 nm.

5. The laser processing head as claimed in claim 4, wherein the optical bandpass filter has a wavelength passband whose full width at half maximum is less than 20 nm.

6. The laser processing head as claimed in claim 4, wherein the optical bandpass filter has a wavelength passband whose full width at half maximum is less than 10 nm.

7. The laser processing head as claimed in claim 1, further comprising:
   a comparator which is designed to output an error report upon overshooting of the minimum distance between target trajectory and current welding midpoint beyond a prescribed distance value.

8. The laser processing head as claimed in claim 1, further comprising:
   an actuator which is designed to control the minimum distance between target trajectory and current welding midpoint to zero by moving the laser beam transverse to a movement direction of the laser processing head by a controlling distance (a).

9. The laser processing head as claimed in claim 8, wherein the actuator is designed to move the laser beam perpendicular to the movement direction by the controlling distance (a).

10. The laser processing head as claimed in claim 1, characterized in that the camera comprises an image recording device that is designed to process the image data by means of an HDR method.

11. The laser processing head as claimed in claim 1, further comprising a beam splitter that couples an observation beam path of the camera coaxially into the laser beam path.

12. The laser processing head as claimed in claim 1, wherein the light cutting device is designed to generate by means of the light source a light fan that strikes the workpiece to be processed obliquely relative to the optical axis (L) of the laser beam so that a light line is generated on the workpiece, and determine a distance between the focusing optics and the workpiece by means of triangulation.

13. The laser processing head as claimed in claim 12, wherein the light line projected onto the workpiece is straight and runs perpendicular to the movement direction of the laser processing head.

14. The laser processing head as claimed in claim 12, wherein the light line projected onto the workpiece runs circularly around the point of impingement of the laser beam on the workpiece.

15. The laser processing head as claimed in claim 1, characterized in that the light source is a laser, in particular a semiconductor laser.

16. A robot device with a laser processing head as claimed in claim 1, which is designed to move the laser processing head so that the weld midpoint is guided along the target trajectory, the current movement direction of the laser beam striking the workpiece being set so that said movement direction points away from the current weld midpoint tangentially relative to the target trajectory.

17. A method for processing a workpiece by means of a laser processing head as claimed in claim 1, by using a laser beam, having the steps of:
   generating on the workpiece a light line that cuts a location to be joined at a predetermined distance (d) in front of a joint,
   imaging the light line at the location to be joined as well as a melt pool (46), produced by the laser beam impinging on the workpiece, at the joint at regular time intervals by means of the camera, and
   processing the image data produced by the camera, having the steps of
      determining an intersection point of the light line with the location to be joined, as well as the midpoint of the melt pool,
      storing the intersection points determined at different instants as target trajectory in a memory, and
      determining a minimum distance between target trajectory and current melt pool midpoint.

18. The method as claimed in claim 17, further having the step of controlling the minimum distance between target trajectory and current melt pool midpoint by moving the laser beam transverse to the movement direction of the laser beam to zero by a controlling distance (a).

* * * * *